Sept. 29, 1959 M. O. KILPATRICK 2,906,792
HYDROCARBON CONVERSION SYSTEM
Filed Dec. 21, 1953
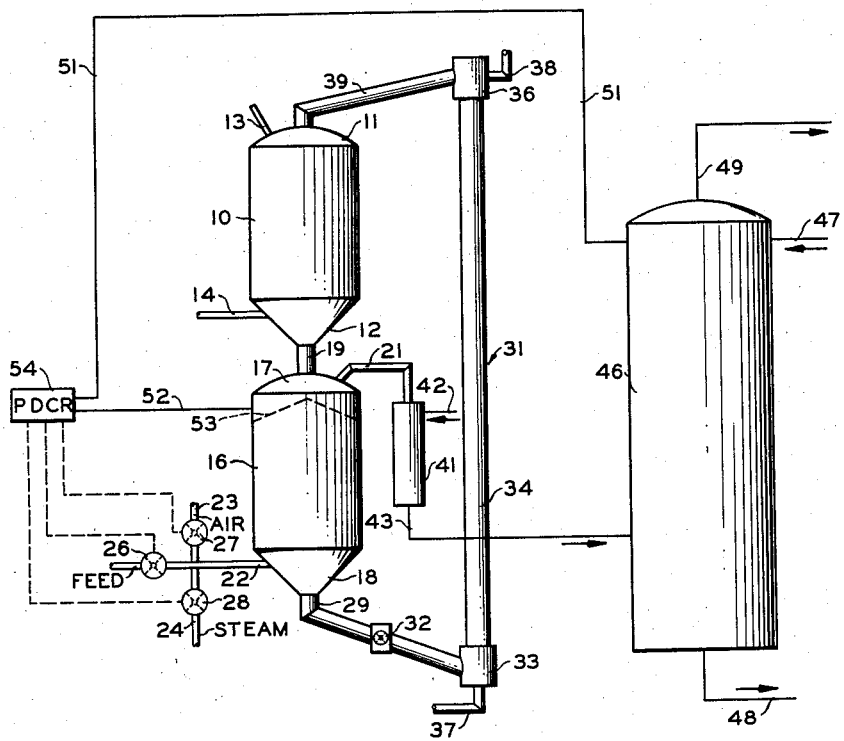
INVENTOR.
M.O. KILPATRICK
BY *Hudson and Young*
ATTORNEYS

United States Patent Office 2,906,792
Patented Sept. 29, 1959

2,906,792

HYDROCARBON CONVERSION SYSTEM

Myron O. Kilpatrick, Bartlesville, Okla., assignor to Phillips Petroleum Company, a corporation of Delaware Application December 21, 1953, Serial No. 399,506

4 Claims. (Cl. 260—683)

This invention relates to a hydrocarbon conversion system. In one of its more specific aspects, it relates to pebble heater apparatus. In another of its more specific aspects, it relates to a process for converting hydrocarbons to lower boiling products. In another of its more specific aspects, it relates to an improved method of operating pebble heater apparatus whereby the formation of carbonaceous materials in the reaction chamber is closely controlled.

In carrying out thermal conversion processes in pebble heater apparatus, a flowing mass of solid heat exchange material, heated to a high temperature by passing gas therethrough in a first direct heat exchange step, is thereafter caused to contact gaseous reaction materials in a second direct heat exchange. Conventional pebble heater apparatus generally comprises two chambers which may be disposed in substantially vertical alignment. The solid heat exchange material is introduced into the upper or heating chamber where the material forms a moving bed of solid heat exchange material which flows downwardly through the chamber in direct heat exchange with hot gaseous heat exchange material. In the heating chamber, the solid heat exchange material is heated to a high temperature and then passed to a lower or reaction chamber in which the hot solid heat exchange material is caused to contact reactant materials in a second direct heat exchange relationship, thereby furnishing heat for the treatment or conversion of the gaseous materials. The solid heat exchange material, cooled as a result of the second heat exchange, emerges from the bottom of the reaction chamber and flows downwardly to the lower part of an elevator which raises the material to the upper end of a chute leading into the upper portion of the heating chamber. The reaction products resulting from the conversion of the reactant materials are removed from the upper portion of the reaction chamber and passed to a quench system for cooling to a temperature at which the desired product is stable.

Solid heat exchange material which is conventionally used in pebble heater apparatus is generally called "pebbles." For a more complete description of the pebbles which can be utilized, reference may be had to U.S. Patent No. 2,536,436.

The pebbles are heated in the heating chamber to a temperature generally in the range of 1200° F. to 3200° F. Ordinarily, pebble inlet temperatures in the reaction chamber are about 100° F. to 500° F. below the average combustion gas temperature within the heating chamber. In processes for the production of ethylene from light hydrocarbons, such as butane or propane, the pebble temperatures in the lower reaction chamber are usually in the range of 1200° F. to 1800° F. In the production of acetylene by pyrolysis of hydrocarbons, temperatures in the range of 1800° F. to 3000° F. are desirable.

A disadvantage encountered in the operation of pebble heater apparatus in hydrocarbon conversion processes results from the deposition of carbonaceous materials in the reaction chamber. During conversion processes, reaction products contact the reaction chamber for a period of time long enough to permit a part of the products to be converted to carbon thereon. The principal points of carbon lay-down are in the upper portion of the reaction chamber above the pebble bed and around the gaseous effluent outlet conduit. As the carbon deposits build up in the reaction chamber, the reactants materials are held therein for a longer residence time, resulting in a deeper cracking reaction than desired and concomitantly in an accelerated lay-down of carbon. Continued formation of carbon in the reaction chamber will result finally in such a buildup of carbon that flow of reaction products from that chamber will be substantially retarded and even terminated. If allowed to proceed to this point, a complete shutdown of the pebble heater apparatus may become necessary in order to remove the carbon deposits from the reaction chamber.

It has been found that the measured pressure drop through the reaction chamber gives an indication of the amount of carbon lay-down in that chamber. Accordingly, an excessive pressure drop through the reaction chamber is an indication of a carbon lay-down therein which must be removed if the desired cracking reaction is to continue. In accordance with this invention, the pressure drop indications are utilized to control hydrocarbon conversion processes so that only intermittent interruptions of short duration are necessary in the conduct of the processes.

The following objects of the invention will be attained by the various aspects of the invention.

It is an object of the present invention to provide an improved process for the conversion of hydrocarbons.

Another object of the invention is to provide means for automatically controlling the amount of carbonaceous materials deposited in the reaction chamber of a pebble heater apparatus.

Still another object of the invention is to provide a method for inhibiting carbon lay-down in the reaction chamber of pebble heater apparatus and for automatically burning out the carbon when the lay-down becomes sufficient to impede efficient operation.

A further object of the invention is to provide a method for controlling the burn-out period necessary to remove carbon deposits from the reaction chamber of pebble heater apparatus.

A still further object is to provide a method for removing carbon deposits from the reaction chamber of a pebble heater system without interrupting the flow of pebbles through that system.

Other and further objects and advantages will become apparent to those skilled in the art from the accompanying disclosure.

Broadly speaking, the present invention comprises intermittently oxidizing carbon from the reaction chamber. Such oxidizing step is ordinarily carried out after measuring the pressure drop through a reaction chamber in which a hydrocarbon conversion process is being carried out. When the pressure drop therethrough becomes excessive as indicative of an appreciable lay-down of carbon, the supply of reactant materials to the chamber is terminated, and an oxidant, such as air and/or steam, is introduced thereinto for the purpose of burning out the carbon. When the pressure drop has decreased to a value which is indicative of the removal of the carbon from the reaction chamber, the oxidant supply is turned off, and reactant materials are again introduced into that chamber.

The present invention is concerned both with the retardation of carbon lay-down in the reaction chamber and the removal of carbon therefrom when the carbon lay-down has reached such proportions that efficient operation of the pebble heater apparatus can no longer be continued. In a preferred method of operation, steam is introduced into the reaction chamber along with the hydrocarbon reactant materials. The presence of the steam serves to inhibit carbon formation by diluting the reactant materials so that the residence time of these materials in the reaction chamber is decreased. When an increase in pressure drop indicates that carbon is forming, more steam is supplied to the reaction chamber, thereby further shortening the reaction time and retarding carbon formation. The amount of hydrocarbon feed material can be cut down concomitantly with the increase in the supply of steam. When the carbon lay-down becomes substantial as indicated by an excessive pressure drop, the supply of hydrocarbon feed is terminated, and air and/or steam are charged to the reaction chamber in order to burn out the carbon deposits.

A more complete understanding of the invention may be obtained by reference to the following description and the drawing which is a diagrammatic elevation of an apparatus particularly suitable for practicing the invention.

Referring particularly to the drawing, the pebble heater apparatus comprises an upright elongated shell 10 closed at its upper and lower ends by closure members 11 and 12, respectively. Gaseous effluent outlet conduit 13 extends from the upper portion of the pebble heating chamber formed within shell 10 while heating material inlet means 14 is provided in the lower portion of that chamber. Upright elongated shell 16, closed at its upper and lower ends by closure members 17 and 18, respectively, is disposed below shell 10. Pebble conduit means such as conduit 19 or a plurality of such conduits, extending between closure member 12 of shell 10 and closure member 17 of shell 16, connects the pebble heating chamber with the reaction chamber formed within shell 16. Gaseous effluent outlet conduit 21 is disposed in the upper portion of the reaction chamber while reactant material inlet conduit 22 is provided in the lower portion of that chamber. Air inlet conduit 23 and steam inlet conduits 24, communicating with reactant material inlet conduit 22, provide means for introducing air and/or steam into the lower portion of the reaction chamber. It is also within the contemplation of the invention to provide a reactant material inlet conduit in the form of a header member, extending at least a portion of the way around the lower part of the reaction chamber and communicating with the interior of that chamber through the wall thereof. Furthermore, separate means can be provided for introducing the air and/or steam into the lower portion of the reaction chamber. Reactant material inlet conduit 22, air inlet conduit 23, and steam inlet conduit 24 are each provided with flow control means 26, 27 and 28, respectively.

Pebble outlet conduit 29 extending downwardly from closure member 18 of the reaction chamber is connected to the lower portion of elevator 31. Pebble feeder 32 is provided intermediate the ends of pebble outlet conduit 29 and may be a conventional pebble feeder such as a star valve, a gate valve, a rotatable table feeder, or the like. Elevator 31, which is of the gas lift type, comprises engaging pot 33, gas lift conduit 34, and disengaging chamber 36. It is to be understood that other conventional pebble elevating means, such as a bucket type elevator, can be employed in the practice of the invention. Lift gas inlet conduit 37 is connected to the lower end of engaging pot 33 while effluent outlet conduit 38 is attached to the disengaging chamber. Pebble inlet conduit 39 extends downwardly from disengaging chamber 36 to the upper end portion of the pebble heating chamber.

Effluent outlet conduit 21 communicates with the upper portion of preliminary quench chamber 41. Heat exchange liquid inlet line 42 is connected to the upper part of the preliminary quench chamber while outlet line 43 leads from the lower portion of that chamber to the lower portion of gas-liquid contact tower 46. Heat exchange liquid inlet line 47 is attached to the upper portion of tower 46 while liquid outlet line 48 is connected to the lower portion of that tower. Outlet line 49 provides means for withdrawing gaseous materials overhead from the gas-liquid contact tower.

Lines 51 and 52, which serve as pressure taps, communicate, respectively, with gas-liquid contact tower 46 and the upper portion of the reaction chamber above the pebble bed therein indicated by reference numeral 53. The other ends of lines 51 and 52 are operatively connected to pressure drop controller-recorder 54, thereby providing means for measuring the pressure drop through the reaction chamber. It is also within the scope of the invention to connect line 51 to effluent outlet conduit 21 or to preliminary quench chamber 41. Pressure drop controller-recorder 54 is operatively connected to flow control means 26, 27 and 28.

In the operation of the apparatus of the drawing, pebbles are heated in the pebble heating chamber formed within shell 10 by contact with hot gaseous heat exchange material which may result from the combustion of fuel outside of the heater chamber or in the lower portion of this chamber in a combustion zone separated from the pebble mass, or by burning a fuel in direct contact with the pebble mass within the chamber. Pebbles are introduced into the pebble heater through pebble inlet conduit 39 and form a contiguous, gravitating mass which extends downwardly through shell 10, pebble conduit 19, shell 16, and pebble outlet conduit 29 to feeder 32. The pebbles, heated in the pebble heating chamber to temperatures generally in the approximate range of 1200° F. to 3200° F., are thereafter gravitated through conduit 19 into the upper portion of the reaction chamber formed within shell 16.

Hydrocarbon feed is introduced into the reaction chamber through inlet conduit 22 along with steam which is passed into conduit 22 through steam inlet conduit 24. The hydrocarbon feed contacts the gravitating mass of heated pebbles and undergoes a cracking reaction. The product containing gas is withdrawn through gaseous effluent outlet conduit 21 and thereafter passed into preliminary quench chamber 41. A heat exchange liquid, such as water, introduced into chamber 41 through line 42 contacts the cracked gas in concurrent flow. The cracked gas is thereby rapidly cooled to a temperature at which it is stable and then passed through line 43 into gas-liquid contact tower 46. The cracked gas rises in tower 46 and is contacted in countercurrent flow with a heat exchange liquid, such as water, introduced into the tower through line 47. The cracked gas is thus further cooled and subjected to a scrubbing action by the water to partially remove the tar therefrom. The cracked gas is then taken overhead from tower 46 through line 49 and passed to purification means such as an oil scrubber and to fractionation means for further treatment of the cracked gas and for recovery of the desired product. A hydrocarbon blower, not shown, is utilized to draw the cracked gas from the reaction chamber through the quench and purification system just described.

During the operation of the process as described above, pressure drop controller-recorder 54 continuously measures the pressure drop through the reaction chamber. It is assumed that the reaction chamber is initially substantially free from carbon deposition and that the hydrocarbon feed and steam are being introduced into the reaction chamber in definite amounts corresponding to the process being carried on in the particular apparatus being utilized. The steam introduced into the reaction chamber tends to inhibit the deposition of carbon by reacting with the carbon to produce water gas which is removed through effluent conduit 21 along with the cracked gas. As the operation of the process continues, an increase in the pressure drop measurement is indicative of the growth of carbon in the reaction chamber. In order to retard this carbon lay-down, the supply of steam to the reaction chamber is increased. The increased steam supply aids in removing carbon by furnishing a greater volume of steam for the water gas reaction. Furthermore, the increased steam serves to dilute the reactant materials, resulting in a shortened residence time in the reaction chamber with a correspondingly shorter contact time with the reaction chamber for the formation of carbon. Simultaneously with the increase in steam supply, the supply of hydrocarbon feed is decreased in order to maintain the desired operating conditions in the reaction chamber. The desired change in the supply of steam and reactant materials to the reaction chamber is effected through the operation of pressure drop controller-recorder 54 which automatically closes valve 26 in conduit 22 and opens valve 28 in conduit 24, each a predetermined amount in accordance with the measured increase in pressure drop through the reaction chamber. Thereafter, the controller-recorder functions to continue closing and opening valves 26 and 28 as the pressure drop through the reaction chamber continues to increase. The controller-recorder can be set to operate the valves continuously with each change in the measured pressure drop or, alternatively, to operate the valves intermittently with definite increments of pressure drop variation.

As the pressure drop through the reaction chamber increases, a certain value will be reached indicating a carbon lay-down of such proportions that efficient and safe operation can no longer be carried on without removal of the carbon from the reaction chamber. At this point, pressure drop controller-recorder 54 operates to completely close valve 26 and to open valve 27, thereby cutting off the supply of hydrocarbon feed and turning on the supply of air to the reaction chamber. The air oxidizes the carbon in the reaction chamber, the combustion products leaving that chamber through effluent conduit 21. By continuing to introduce steam into the reaction chamber, overheating of the pebbles in the reaction chamber is prevented. Furthermore, the steam aids in removal of the carbon by the water gas reaction as previously mentioned. During the burn-out period, the progress of the carbon removal is indicated by decreasing pressure drop readings as recorded by the controller-recorder. During this decrease in pressure drop, the controller-recorder also functions to close valve 28 in steam conduit 24 to its original setting. At that point when the pressure drop decreases to its original value as recorded at the start of the process, the controller-recorder operates to completely close valve 27 and to open valve 26 in reactant materials inlet conduit 22 to its original setting. Steam and hydrocarbon feed are now supplied to the reaction chamber in amounts corresponding to those supplied at the commencement of the process. During the practice of the process as described above, a continuous supply of heated pebbles is introduced into the reaction chamber and removed from the lower portion thereof for return to the heating chamber.

The actual pressure drops through the reaction chamber encountered during the operation as described hereinabove will depend upon the particular pebble heater apparatus used and on the particular process being carried on therein. For example, in the production of ethylene in a specific pebble heater apparatus, when cracking butane, an initial pressure drop of 21 inches of water would be exemplary while, when cracking ethane, an initial pressure drop of from 26 to 27 inches of water may be recorded. In general, it can be stated that as the depth of cracking increases, the effluent volume increases with a corresponding increase in pressure drop. Furthermore, the pressure drop which can be tolerated before the carbon must be burned out by the introduction of air is dependent upon the particular apparatus utilized. In general, the pressure drop should not be allowed to reach such a value that pebbles are carried out of the reaction chamber with the effluent. Or still again, the pressure drop should not reach such a value that the hydrocarbon blower utilized to draw the cracked gas from the reaction chamber through the quench and purification system is allowed to operate at sub-atmospheric pressure.

A better understanding of the invention can be obtained by consideration of the following illustrative example which is not intended to be unduly limitative of the invention.

In a process for the production of ethylene, steam and a hydrocarbon feed comprising essentially butane is introduced into the reaction chamber of a pebble heater apparatus similar to that shown in the drawing. The hydrocarbon feed on contacting the heated pebbles in the reaction chamber is cracked therein at a temperature of about 1600° F. An effluent containing ethylene is removed from the upper portion of the reaction chamber, and introduced into a preliminary quench chamber where is is contacted with water in concurrent flow. The cracked gas cooled to a temperature of between about 500° F. and 750° F. is passed from the preliminary quench chamber into the lower portion of a gas-liquid contact tower. The cracked gas rises in the tower and is contacted with water in countercurrent flow. The cracked gas now cooled to a temperature between about 100° F. and 150° F. is removed overhead from the gas liquid contact tower and passed to an oil scrubber for tar removal and to a fractionation means for recovery of the product ethylene.

In the initial stages of the cracking reaction, the pressure drop controller-recorder indicates a pressure drop of 21 inches of water. As the reaction continues, the pressure drop increases indicating that carbon has formed in the reaction chamber. When the pressure drop measurement reaches 22 inches of water, the pressure drop controller-recorder operates appropriate valves to automatically cut back on the hydrocarbon feed and to increase the supply of steam to the reaction chamber. As the pressure drop further increases, the controller-recorder operates to further cut back on the hydrocarbon feed and to increase the supply of steam. When the pressure drop measurement reaches 26 inches of water, the controller-recorder operates to cut off the supply of hydrocarbon feed and turns on the supply of air to the reaction chamber. The carbon contained in the reaction chamber is thereby burned out, forming an effluent containing water gas which is removed from the upper portion of the reaction chamber. When the pressure drop measurement decreases to 21 inches of water, the controller-recorder operates to turn off the air and turns on the hydrocarbon feed to the reaction chamber. During the decrease of the pressure drop to 21 inches of water the controller-recorder also operates to cut back on the steam so that correct proportions of hydrocarbon feed and steam are charged to the reaction chamber.

It will be apparent that by carrying out the process of this invention as described hereinbefore, I have provided an effective method of controlling the formation of carbonaceous materials in the reaction chamber of pebble heater apparatus. Furthermore, by operating in the described manner effective control over the burn-out periods cans be maintained, thereby reducing to a minimum the length and the number of periods during which the pebble heater apparatus is not on stream. By maintaining such close control over the progress of carbon growth in the reaction chamber and by removing the carbon before an excessive lay-down has been allowed to accumulate, complete shutdown of pebble heater apparatus for substantial repairs is thereby eliminated.

As will be evident to those skilled in the art, various modifications of this invention can be made or followed in the light of the foregoing disclosure and discussion without departing from the spirit or scope of the invention.

I claim:

1. In an improved method of operating pebble heater apparatus wherein pebbles are heated in a heating chamber with a hot heating gas and the resulting heated pebbles are then passed to an reaction chamber and contacted with hydrocarbon reactant materials in said reaction chamber in order to thermally convert said hydrocarbon reactant materials, and the resulting product is removed from said reaction chamber through a product effluent line, the improvement which comprises continuously measuring the pressure drop through said reaction chamber; terminating the supply of reactant materials to said reaction chamber when said pressure drop measurement reaches a predetermined value while continuing to heat pebbles in said heating chamber with said heating gas; introducing an oxidant into the lower portion of said reaction chamber; burning out any carbon contained in said reaction chamber; removing the resulting combustion products from said reaction chamber through said product effluent line; terminating the supply of oxidant to said reaction chamber when said pressure drop measurement reaches a predetermined value; and continuing the supply of reactant materials to said reaction chamber.

2. In an improved process for conversion of hydrocarbons to lower boiling products which comprises heating a uniform, contiguous mass of pebbles in a pebble heating chamber to a temperature in the range of about 1200° F. to 3200° F. by contact with a combustible mixture of fuel and oxygen; gravitating the heated pebbles from the lower portion of said heating chamber into the upper portion of a pebble reaction chamber; contacting said heated pebbles with reactant materials in said reaction chamber; removing effluent material from the upper portion of said reaction chamber through a product effluent line; removing the cooled pebbles from the lower portion of said reaction chamber; and returning said cooled pebbles to the upper portion of said heating chamber; the improvement comprising continuously measuring the pressure drop through said reaction chamber; terminating the supply of reactant materials to said reaction chamber when said pressure drop measurement reaches a predetermined value while continuing to heat pebbles in said heating chamber with said combustible mixture; introducing an oxidant into the lower portion of said reaction chamber; burning out any carbon contained in said reaction chamber, thereby forming combustion products; removing said combustion products from the upper portion of said reaction chamber through said product effluent line; terminating the supply of oxidant to said reaction chamber when said pressure drop measurement reaches a predetermined value; continuing the supply of reactant materials to said reaction chamber; and repeating the above enumerated steps when said pressure drop measurement reaches a predetermined value indicative of an excessive lay-down of carbon in said reaction chamber.

3. In an improved process for conversion of hydrocarbons to lower boiling products which comprises heating a uniform, contiguous mass of pebbles in a pebble heating chamber to a temperature in the range of about 1200° F. to 3200° F. by contact with a combustible mixture of fuel and oxygen; gravitating the heated pebbles from the lower portion of said heating chamber into the upper portion of a pebble reaction chamber; contacting said heated pebbles with hydrocarbon feed in said reaction chamber; introducing steam into the lower portion of said reaction chamber; removing effluent material from the upper portion of said reaction chamber through a product effluent line; removing the cooled pebbles from the lower portion of said reaction chamber; and returning said cooled pebbles to the upper portion of said heating chamber; the improvement comprising continuously measuring the pressure drop through said reaction chamber; increasing the supply of steam and decreasing the supply of hydrocarbon feed to said reaction chamber when said pressure drop measurement reaches a predetermined value; continuing to increase the supply of steam and to decrease the supply of hydrocarbon feed to said reaction chamber as said pressure drop measurement increases in definite increments; terminating the supply of hydrocarbon feed to said reaction chamber when said pressure drop measurement increases to a predetermined value while continuing to heat pebbles in said heating chamber with said combustion mixture; introducing air into the lower portion of said reaction chamber along with said steam; burning out any carbon contained in said reaction chamber, thereby forming an effluent containing water gas; removing said effluent containing water gas from the upper portion of said reaction chamber through said product effluent line; terminating the supply of air to said reaction chamber when said pressure drop measurement decreases to a predetermined value; continuing the supply of hydrocarbon feed and steam to said reaction chamber; and following the above enumerated sequence of steps when said pressure drop measurement reaches a predetermined value indicative of an excessive carbon lay-down in said reaction chamber.

4. In an improved process for conversion of hydrocarbons to lower boiling products which comprises heating a uniform, contiguous mass of pebbles in a pebble heating chamber to a temperature in the range of about 1200° F. to 3200° F. by contact with a combustible mixture of fuel and oxygen; gravitating the heated pebbles from the lower portion of said heating chamber into the upper portion of a pebble reaction chamber; introducing a hydrocarbon feed and steam into the lower portion of said reaction chamber; removing effluent material from the upper portion of said reaction chamber through a product effluent line; removing the cooled pebbles from the lower portion of said reaction chamber; and returning said cooled pebbles to the upper portion of said heating chamber; the improvement comprising continuously measuring the pressure drop through said reaction chamber; continuously increasing the supply of steam and decreasing the supply of hydrocarbon feed to said reaction chamber as said pressure drop measurement increases; terminating the supply of hydrocarbon feed to said reaction chamber when said pressure drop measurement increases to a predetermined value while continuing to heat pebbles in said heating chamber with said combustible mixture; introducing air into the lower portion of said reaction chamber; burning out any carbon contained in said reaction chamber; removing the resulting combustion products from the upper portion of said reaction chamber through said product effluent line; decreasing the supply of steam to said reaction chamber as said pressure drop measurement decreases; terminating the supply of air to said reaction chamber when said pressure drop measurement decreases to a predetermined value; continuing the supply of hydrocarbon feed and steam to said reaction chamber; and following the above-enumerated sequence of steps when said pressure drop measurement reaches a predetermined value indicative of an excessive carbon lay-down in said reaction chamber.

References Cited in the file of this patent

UNITED STATES PATENTS

| | | |
|---|---|---|
| 2,470,578 | Royster | May 17, 1949 |
| 2,643,216 | Findlay | June 23, 1953 |
| 2,663,678 | Kilpatrick | Dec. 22, 1953 |